(12) United States Patent
Fujisaki

(10) Patent No.: US 7,071,725 B2
(45) Date of Patent: Jul. 4, 2006

(54) DATA PROCESSING APPARATUS AND LOGICAL OPERATION APPARATUS

(75) Inventor: Koichi Fujisaki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 92 days.

(21) Appl. No.: 10/849,253

(22) Filed: May 20, 2004

(65) Prior Publication Data

US 2004/0233749 A1 Nov. 25, 2004

(30) Foreign Application Priority Data

May 23, 2003 (JP) .......................... P2003-146491

(51) Int. Cl.
*H03K 19/003* (2006.01)
(52) U.S. Cl. .................. 326/8; 326/9; 326/11; 326/12; 713/168
(58) Field of Classification Search ................. 326/35, 326/8, 9, 11, 12
See application file for complete search history.

(56) References Cited

U.S. PATENT DOCUMENTS

| | | | |
|---|---|---|---|
| 6,420,896 B1 * | 7/2002 | Maeno | 326/9 |
| 6,510,518 B1 * | 1/2003 | Jaffe et al. | 713/168 |
| 6,756,808 B1 * | 6/2004 | Furuya | 326/9 |
| 2003/0091191 A1 * | 5/2003 | Watanabe et al. | 380/277 |
| 2005/0134319 A1 * | 6/2005 | Bock | 326/104 |

FOREIGN PATENT DOCUMENTS

JP 2000-066585 3/2000

OTHER PUBLICATIONS

Paul Kocher et al.; "Differential Power Analysis", Advances in Cryptology of CRYPTO '99, Springer-Verlag Lecture notes in Computer Science vol. 1666, pp. 388-398 (1999), no month.

Tomohiro Yoneda; "Abstracted Instruction Cache of TITAC2—As A Benchmark For Timed Asynchronous Circuit Verification", TR99-0002, (Jun. 1999).

* cited by examiner

Primary Examiner—Vibol Tan
(74) Attorney, Agent, or Firm—Finnegan, Henderson, Farabow, Garrett & Dunner, L.L.P.

(57) ABSTRACT

A data processing apparatus comprises a plurality of input signal lines, a plurality of output signal lines and an electronic circuit. The electronic circuit inputs first data from the plurality of input signal lines and outputs second data to the plurality of output signal lines. The first data is one bit data represented by a combination of bits of the plurality of input signal lines. The second data is one bit data represented by a combination of bits of the plurality of output signal lines.

17 Claims, 9 Drawing Sheets

DATA PROCESSING APPARATUS AND LOGICAL OPERATION APPARATUS

CROSS-REFERENCE TO RELATED APPLICATIONS

This application is based upon and claims the benefit of priority from prior Japanese Patent Application P2003-146491, filed on May 23, 2003; the entire contents of which are incorporated herein by reference.

FIELD OF THE INVENTION

The present invention relates to a data processing apparatus and a logical operation apparatus for processing data as an operation object.

BACKGROUND OF THE INVENTION

In an LSI having an operation processing apparatus such as a microcomputer, DPA (Differential Power Analysis) measures the power consumed while processing a cryptograph operation and extracts key information from the LSI based on the consumed power (For example see, Paul Kocher, Joshua Jaffe, and Benjamin Jun, "Differential Power analysis". In Advances in Cryptology of CRYPTO '99 Springer-Verlag Lecture notes in Computer Science Vol. 1666 p. 388–398).

We explain the principle of differential power analysis (DPA).

First: A plain data is input to the LSI and is ciphered using a secret key. During a cipher operation, a consumed power is measured. Using some different plain data, such measurement is performed several times.

Second: Guess a secret key and calculate guessed intermediate values determined by a secret key, the plain data and the cipher data. Calculate a correlation between the guessed values and the power consumption data. If the guessed key is collect, a strong correlation occurs between the guessed value and the consumed power of the ciphered data using a secret key. On the other hand, if the guessed key is mistaken, a correlation between the guessed value and the consumed power is weak.

By using this principle, DPA is a method for estimating key information in a cryptographic operation circuit by measuring the consumed power. DPA is thus an attack without destructive action so it is difficult to judge a damage of DPA from an appearance of apparatus. Therefore, it won't notice having been attacked or discovering will be overdue and damage is expanded. Since it is above, protection from DPA in the cryptograph operation circuit is necessary.

Briefly, we explain the relation between power consumption and operation data.

A usual LSI is manufactured CMOS (Complementary Metal-Oxide Semiconductor) design, one bit data is represented as one line, and the clock signal is used for it. A change of power consumption depends on current data and previous data because of characteristics of CMOS.

Hereinafter, we explain an operation of NOT element (inverter) of CMOS design. FIG. 1 is a block diagram of CMOS design of the prior art. As shown in FIG. 1, NOT element, which using CMOS design, includes a power supply line $V_{cc}$, a ground line GND, nMOS and pMOS transistors serially connected between $V_{cc}$ and GND, an input signal line connected to gates of nMOS and pMOS transistors, an output signal line connected to connection line between nMOS and pMOS transistors, and a capacity C connected between the output signal line and GND.

If input of NOT element is high (or "1"), the nMOS transistor conducts. A positive electric charge of the capacity C flows to GND through the nMOS transistor. Accordingly, electric potential of the output becomes low (or "0"). In this case, "high" is electric potential logically recognized as "1" and "low" is electric potential logically recognized as "0" in the operation processing apparatus.

Conversely, if the input of NOT element is low, the pMOS transistor conducts, and nMOS becomes non-conductive status. Accordingly, positive electric charge is accumulated in the capacity C from $V_{cc}$ and the electric potential of the output becomes high.

In the case that input transition does not occur (For example, the input maintains high), the nMOS transistor is continuously conductive status, and the electric potential of the output is continuously low. In this case, the pMOS transistor is non-conductive status. Accordingly, the electric charge does not flow to GND and the power is not consumed. On the other hand, in the case that the input maintains low, the pMOS transistor becomes conductive, and the electric potential of the output is continuously high. In this case, the nMOS transistor is non-conductive. Accordingly, the electric charge does not flow to GND and the power is not consumed.

In this way, in the case that status of the signal line does not change as ideal status, CMOS design does not consume power. A low power consumption LSI is realizable with CMOS design.

Ideally, a logic element using CMOS design consumes only electric power when input signal changes. As a result, the consumed power of CMOS design with input transition is different from the consumed power of CMOS design without input transition. Accordingly, if transition of the signal line relates to key information, the consumed power changes in relation to the operation of the key information. This change of the consumed power can be observed from the outside. In this case, the key information can be specified by DPA.

Ideally, CMOS design does not consume power when signals aren't changed. Electric power is consumed by not only changes of a signal line but leakage current. This leakage current flows from an input to a drain through a gate of the pMOS or nMOS transistor, or flows from $V_{cc}$ to GND through the pMOS or nMOS transistor. The leakage current quantity depends on statuses of input signal line and output signal line of CMOS design.

As mentioned-above, in the case of data operation of microcomputer using CMOS design, a change in the consumed power is detected dependent on the power consumed based on status "0, 1" of signal line without status transition of signal line, and the number of signal lines of transition.

Usually, a CMOS design circuit in which a datum is represented by a single data line (single rail), the change of power consumption depends on previous data and current data. During executing operation related with key information, if change of the consumed power correlates with the key information, the key information in the microcomputer can be estimated by DPA.

In the prior art, as a countermeasure for DPA, data to be operated is masked and operated (For example, Japanese Patent Disclosure (Kokai) P2000-66585). In this method, key information is masked and operation is executed using the masked key information so that change of consumed power on operation using the key information does not correlate with the key information. Briefly, by masking key information, non-relationship between change of consumed power and key information is regarded as defense for DPA. In this way, non-relationship between change of consumed power and key information is effective as defense for DPA. However, in this method, extra hardware or calculation time is necessary for mask operation.

As a countermeasure for attack by DPA, except for masking intermediate data by random number, a method for constantly equalizing the consumed power irrespective of operation data is considered. In a circuit component in which the consumed power is constantly equal irrespective of value of intermediate data, change of the consumed power does not correlate with the key information, and this method is used as countermeasure for DPA. In order to realize this method, the circuit component independent on processing data and previous processing data in microcomputer is necessary. However, this technique is not known yet.

SUMMARY OF THE INVENTION

The present invention is directing to a data processing apparatus and a logical operation apparatus of which consumed power is constant irrespective of contents of data as an operation object.

According to an aspect of the present invention, there is provided a data processing apparatus, comprising: a plurality of input signal lines; a plurality of output signal lines; and an electronic circuit configured to input first data from the plurality of input signal lines and to output second data to the plurality of output signal lines, the first data being one bit data represented by a combination of bits of the plurality of input signal lines and the second data being one bit data represented by a combination of bits of the plurality of output signal lines.

According to another aspect of the present invention, there is also provided a logical operation apparatus, comprising: a first data holding circuit configured to input one bit data represented by a combination of bits of two signal lines, to temporarily store the one bit data, and to output the one bit data; a second data holding circuit configured to input one bit data represented by a combination of bits of other two signal lines, to temporarily store the one bit data, and to output the one bit data; a first logical operation circuit configured to execute a logical operation of a first input data and a second input data, the first input data being a bit status of a first output signal line of the first data holding circuit, the second input data being a bit status of a first output signal line of the second data holding circuit; a second logical operation circuit configured to execute a logical operation of a first input data and a second input data, the first input data being a bit status of a second output signal line of the first data holding circuit, the second input data being a bit status of a second output signal line of the second data holding circuit; and a third data holding circuit configured to input one bit data represented by a combination of bits of an output signal line of the first logical operation circuit and an output signal line of the second logical operation circuit.

According to still another aspect of the present invention, there is also provided A logical operation apparatus, comprising: a first data holding circuit configured to input one bit data represented by a combination of bits of two signal lines, to temporarily store the one bit data, and to output the one bit data by a first output signal line and a second output signal line; and a second data holding circuit configured to input one bit data from a first input signal line and a second input signal line, the one bit data being represented by a reverse combination of bits of the first output signal line and the second output signal line, to temporarily store the one bit data, and to output the one bit data.

DETAILED DESCRIPTION OF THE EMBODIMENTS

Figure 1:
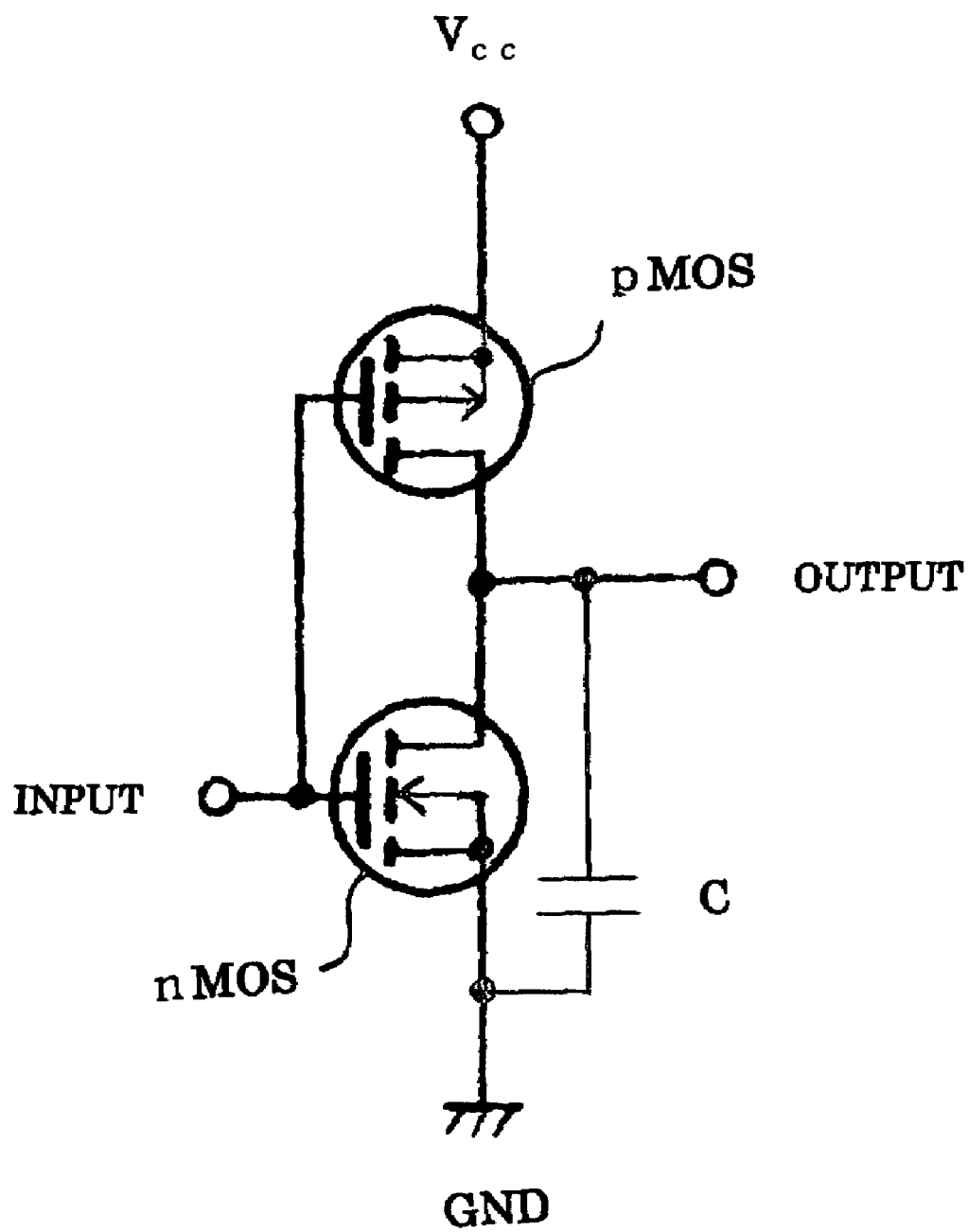
FIG. 1 is a block diagram of a prior art CMOS design.

Hereinafter, various embodiments of the present invention will be explained by referring to the drawings.

First, basic component of the present embodiment is explained. In the present embodiment, in order to fix a hamming weight of a data path unit, one bit data is represented by a plurality of signal lines (In the prior art, one bit data is represented by one signal line).

Briefly, data given by n($\geq$2) signal lines is not regarded as n bits data but regarded as one bit data determined by combination of bit status of n signal lines. Hereinafter, component in which one bit data is represented by two signal lines is mainly explained.

In the prior art, in the case that one bit data is represented by one signal line, status "1" or "0" of the one signal line corresponds to a value of one bit data. However, in the case that one bit data is represented by two signal lines, by combining statuses of the two signal lines, a status "high" or "1" (bit value=1) in single rail logic is represented as "(1,0)" in dual rail logic. Briefly, the first signal line represents a status "1" and the second signal line represents a status "0". Furthermore, a status "low" or "0" (bit value=0) in single rail logic is represented as "(0,1)" in dual rail logic. Briefly, the first signal line represents a status "0" and the second signal line represents a status "1". Conversely, status "1" in single rail logic may be represented as "(0,1)" in dual rail logic, and status "0" in single rail logic may be represented as "(0,1)" in dual rail logic. In either case, the hamming weight of data path unit is constantly "1".

In this way, data of the data path unit is coded and one bit data is represented as two signal lines (dual rail logic). In the operation processing apparatus manufactured using CMOS design, irrespective of data contents, the number of signal lines of status 1 is equal to the number of signal lines of status 0 in the data path unit operating key information.

We explain the reason why the hamming weight (the number of signal lines of status 1) is fixed. In single rail logic, one bit data is represented as one signal line (single rail). The hamming weight of bit value "0" is "0", and the hamming weight of bit value "1" is "1". On the other hand, in dual rail logic, one bit data is represented as two signal lines. The hamming weight of bit value "0" is "1", and the hamming weight of bit value "1" is "1". In dual rail logic, the hamming weight is constantly equal irrespective of the data contents, and the hamming weight of the data path unit is fixed during operation.

The consumed power (static consumed power) without transition of signal line depends on the hamming weight of the data path unit. Accordingly, the static consumed power in dual rail logic can be fixed irrespective of the data contents. As a result, there is no correlation between the static consumed power and the key information. By applying such component to the cryptograph operation circuit, DPA can be prevented.

Furthermore, in a two phase system of the present embodiment, one phase (working phase) has valid data, and one phase (idle phase) has invalid data.

First, a period when coded valid data flows in the data path unit is the working phase. Furthermore, in order to equalize a number of signal lines of status transition, a period when invalid data flows in the data path unit is the idle phase.

For example, in dual rail logic, while one bit data is represented as "(1,0) or (0,1)", "(0,0) or (1,1)" of which hamming distance from "(1,0) and (0,1)" is equal is invalid data. "(0,0)" represents both statuses 0 of the first signal line and the second signal line. "(1,1)" represents both statuses 1 of the first signal line and the second signal line.

In this way, by flowing valid data in the working phase and flowing invalid data in the idle phase, there is no dependent relationship between data of two neighboring working phases at both sides of the idle phase on the time axis. Two signal lines representing one bit data assume a status of invalid data (0,0) or (1,1) in the idle phase. Accordingly, the following data is not related to the previous valid data of a previous working phase before an idle phase.

Furthermore, the signal lines of dual rail logic changes from a status of original data (1,0) or (0,1) to a status of invalid data (0,0) or (1,1). Accordingly, the number of signal lines of status transition from 1 to 0 or from 0 to 1 is fixed, and the consumed power (dynamic consumed power) based on status transition of signal lines can be fixed irrespective of the data contents. As a result, a correlation between dynamic consumed power and key information does not exist.

Figure 3:
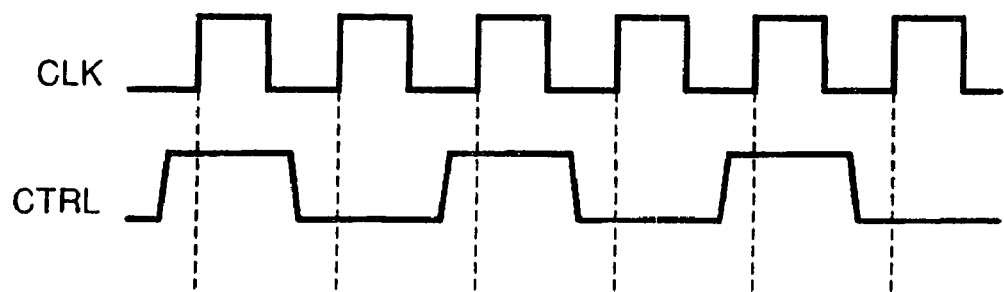
FIG. 3 is one example of a timing chart of a clock signal and a control signal according to one embodiment of the present invention.

By applying such component to the cryptograph operation circuit, DPA can be prevented. Now, assume that the working phase and the idle phase are mutually set. For example, as shown in FIG. 3, in synchronization with timing of a rise edge of a clock signal CLK, a control signal CTRL is mutually repeated as "high" and "low". In the data path unit, the working phase and the idle phase are mutually repeated according to the control signal. In FIG. 3, the working phase and the idle phase are changed by timing of the rise edge of the clock signal, but may be changed by timing of a fall edge of the clock signal.

In this case, a status of signal line of the working phase is (1,0) or (0,1), and a status of signal line of the idle phase is (0,0) or (1,1). Accordingly, status transition from the working phase to the idle phase is (1,0)→(0,0), (1,0)→(1,1), (0,1)→(0,0) or (0,1)→(1,1). Furthermore, status transition from the idle phase to the working phase is (0,0)→(1,0), (0,0)→(0,1), (1,1)→(1,0) or (1,1)→(0,1). In either case, the number of signals of status transition is fixed at one.

In the above mentioned-circuit component of dual rail-two phase logic, the idle phase is set at timing of the rise edge (or fall edge) of the clock signal. In order for a register not to hold data of the idle phase inside, input signal is monitored. When invalid data of the idle phase is detected, input data (invalid data) is not held in the register. On the other hand, when data of the working phase is detected, input data (valid data) is held in the register at timing of the rise edge (or the fall edge) of the clock signal.

Furthermore, a control signal line may represent the idle phase or the working phase. In the case of the idle phase, an AND element or an OR element is included in an output unit of the register so that invalid data flows in the data path unit. In this component, invalid data may be input to a combination circuit forward the register.

Hereinafter, example circuits of dual rail-two phase logic are explained. First, an example data holding circuit (register) holds input data of the working phase and does not hold input data of the idle phase.

Figure 2:
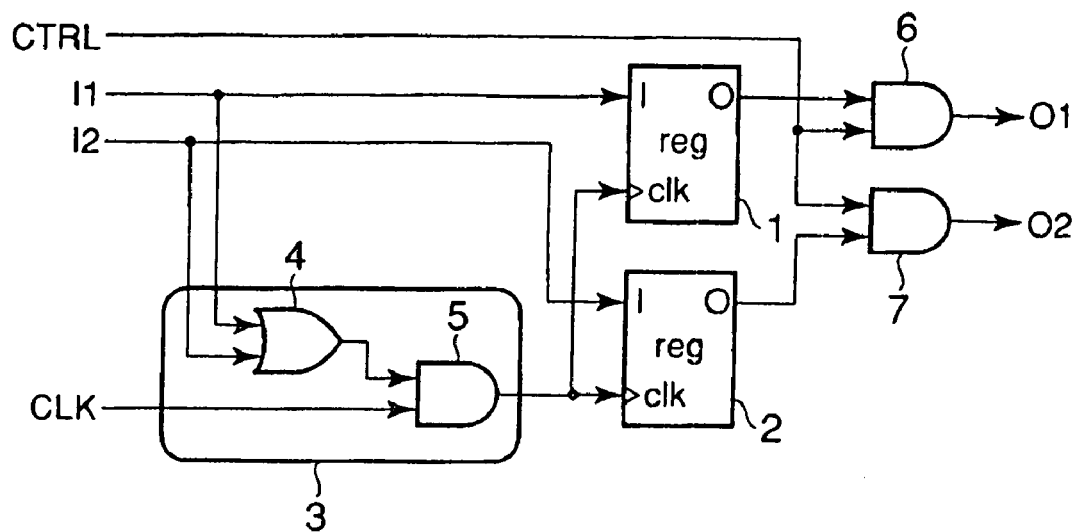
FIG. 2 is a block diagram of a data processing apparatus according to one embodiment of the present invention.
Figure 4:
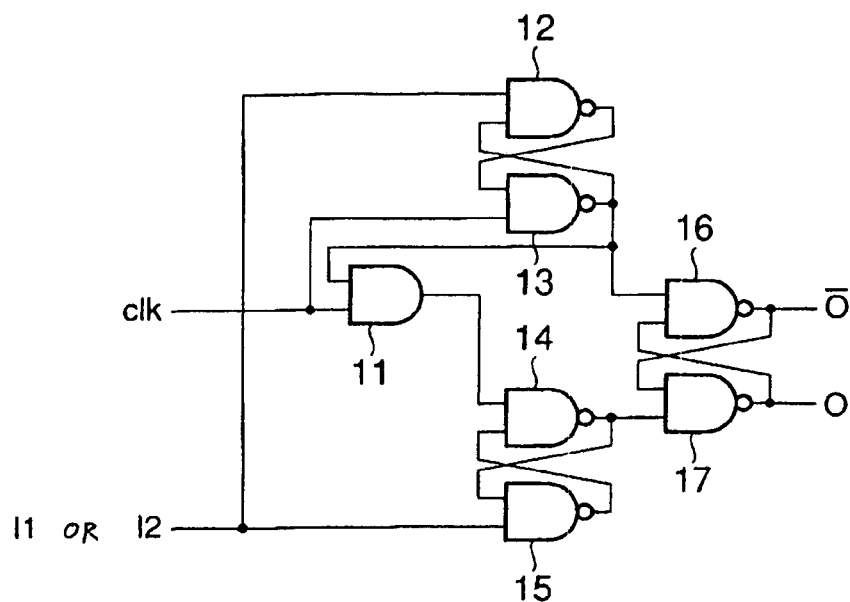
FIG. 4 is a block diagram of D flip flop of single rail using the clock signal.

FIG. 2 is a block diagram of a data holding circuit which holds dual rail data. The data holding circuit includes a first register 1, a second register 2, a monitor circuit 3, a first AND circuit 6, and a second AND circuit 7. The monitor circuit 3 includes an OR circuit 4 and an AND circuit 5. FIG. 4 shows one example of a flip-flop of edge-trigger type usable as the first register 1 and the second register 2. This flip-flop consists of one AND circuit 11 and six NAND circuits 12~17. Furthermore, a flip-flop of master-slave type may be used as the registers 1 and 2.

As for the data holding circuit in FIG. 2, invalid data (0,0) is regarded as the idle phase. However, by modifying the component of FIG. 1, invalid data (1,1) may be regarded as the idle phase.

In FIG. 2, for example, signal shown in FIG. 3 is supplied to the control signal CTRL and the clock signal CLK. In this example, CTRL "high" represents the working phase and CTRL "low" represents the idle phase.

As shown in FIG. 2, in order to hold dual rail coded data, the data holding circuit can be realized using D flip-flop of single rail. By aligning two D flip-flops 1 and 2, dual rail coded data can be held.

The monitor circuit 3 monitors whether a status of signal lines is the idle phase. For example, in the case that a status of signal lines (0,0) of the data path unit is the idle phase, the monitor circuit 3 can be realized by an OR circuit 4 and an AND circuit 5 as shown in FIG. 2. Furthermore, in the case that a status of signal lines (1,1) is the idle phase, the monitor circuit 3 can be realized by a NAND circuit and an AND circuit (not shown in FIG. 2).

Output from the first AND circuit 6 and the second AND circuit 7 is output of the dual rail logic. In FIG. 2, (1,0) or (0,1) is output in the working phase, and (0,0) is output in the idle phase.

Figure 5:
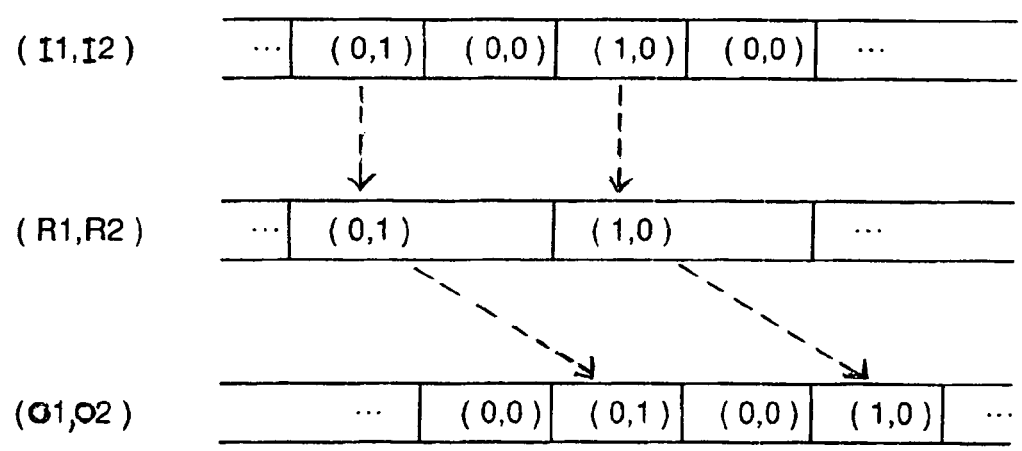
FIG. 5 is schematic diagrams of operation example of a data processing apparatus according to one embodiment of the present invention.

FIG. 5 shows one example of a timing chart of operation of the data holding circuit. In FIG. 5, (I1,I2) represents each status of input I1 and I2 of FIG. 2; (R1, R2) represents holding status of each register 1 and 2 of FIG. 2; (O1,O2) represents each status of output O1 and O2 of FIG. 2. Input data of the working phase is held in the next idle phase (Briefly, invalid data of the idle phase is not held). The input data held is output in the next working phase.

As mentioned-above, in this data holding circuit, data of a working phase is input and held in the working phase and an idle phase; invalid data of the idle phase is not input; predetermined invalid data is output in the idle phase; and the held data is output in the next working phase.

As a method for realizing the data holding circuit, as shown in a component example of FIG. 2, D flip-flop of single rail logic can be realized. However, it may be realized by a smaller number of logical elements.

Figure 6:
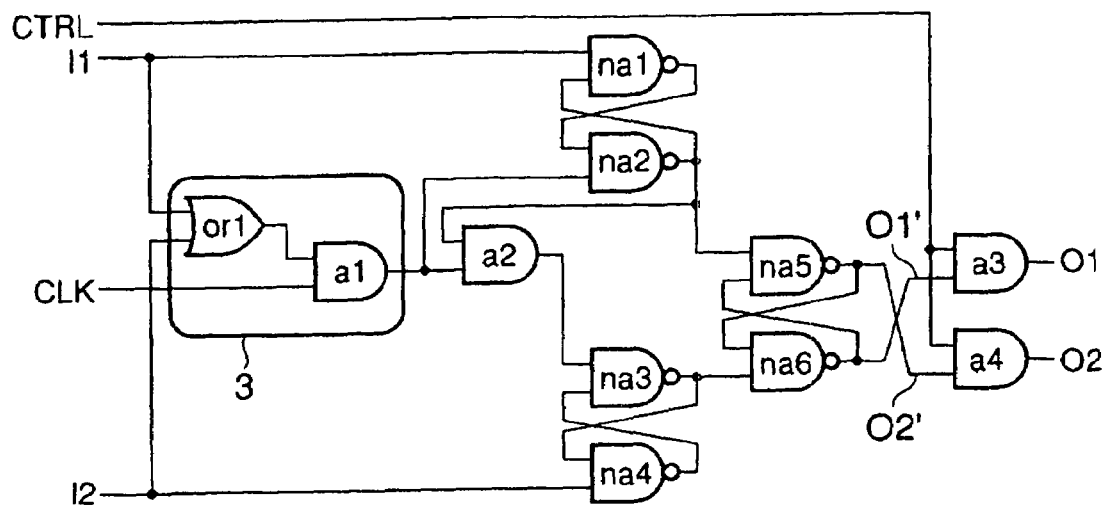
FIG. 6 is another block diagram of a data processing apparatus according to one embodiment of the present invention.

FIG. 6 is a block diagram of the data holding circuit using a smaller number of logical elements. As shown in FIG. 6, this data holding circuit includes an OR circuit or1, AND circuits a1~a4, and NAND circuits na1~na6. The monitor circuit 3 is composed by an OR circuit or1 and an AND circuit a1.

As for the data holding circuit in FIG. 6, invalid data (0,0) is regarded as the idle phase. However, by modifying the component of FIG. 6, invalid data (1,1) may be regarded as the idle phase.

Figure 7:
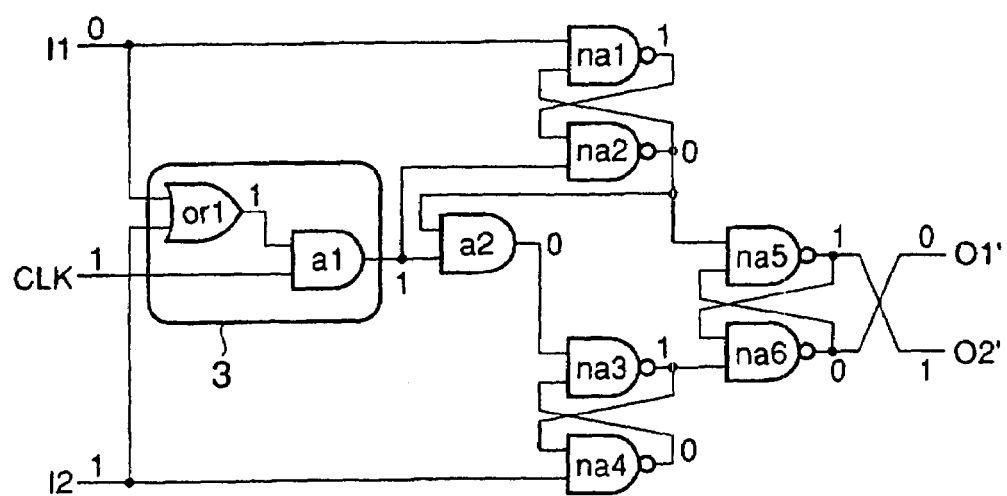
FIG. 7 is a schematic diagram of working phase of the data processing apparatus of FIG. 6.
Figure 8:
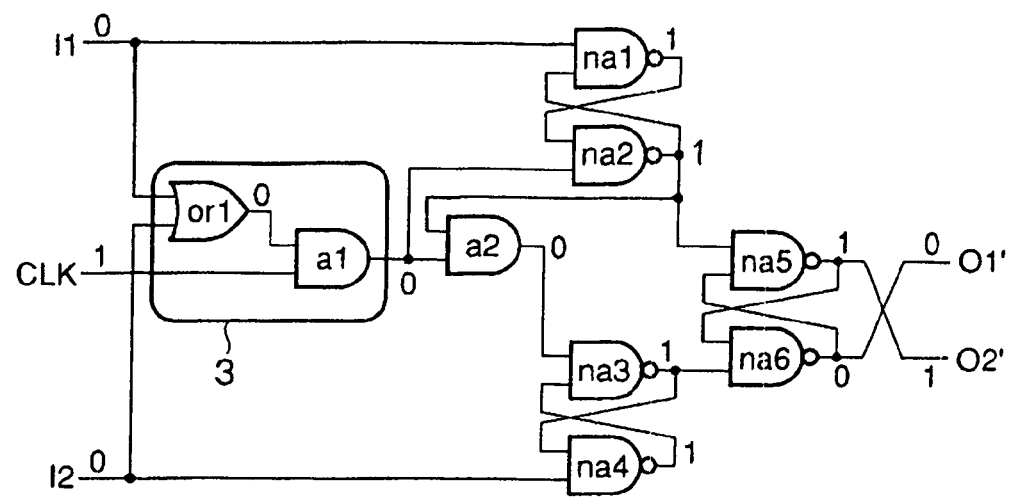
FIG. 8 is a schematic diagram of idle phase of the data processing apparatus of FIG. 6.

Next, by referring to FIGS. 7 and 8, operation of the data holding circuit of dual rail-two phase logic of FIG. 6 is explained in detail. In FIGS. 7 and 8, the AND circuits a3 and a4 of FIG. 6 are omitted.

First, assume that the circuit of FIG. 6 is in the idle phase, and input I1 and I2 are respectively "0".

Next, assume that the status changes to the working phase, and input I2 is changed to "1" as shown in FIG. 7. In this case, output of or1 is changed from "0" to "1". Then, as shown in FIG. 7, by rise edge of the clock signal CLK from "0" to "1", output of AND element a1 is changed from "0" to "1". Accordingly, output of the NAND element na2 changes from "1" to "0", output of the AND element a2 changes to "0", and output of the NAND element na3 changes to "1", output of the NAND element na5 is "1", and output of the NAND element na6 is "0". Output of the NAND elements na5 and na6 is input to the AND elements a4 and a3, and executed as AND operation with the control signal CTRL. As a result, data (0,1) of the working phase is output.

Furthermore, the status changes from the working phase to the idle phase, and input I2 changes from "1" to "0" as shown in FIG. 8. In this case, output of OR element or1 is "0", and outputs of AND element a1 and a2 are respectively "0". Based on the output "0" of AND element a1, output of NAND element na2 is "1", and output of NAND element na3 is also "0". Outputs of NAND elements na5 and na6 do not change. Outputs of NAND elements na5 and na6 are respectively input to AND elements a4 and a3, and executed as AND operation with the control signal CTRL. As a result, data (0,0) of the idle phase is output.

As mentioned-above, in the data holding circuit of dual rail logic of FIG. 6, input of a working phase is held in the working phase; input of an idle phase is not held in the idle phase; held data of the working phase is continuously held in the idle phase; and the held data is output in next the working phase.

By using such register, the working phase and the idle phase are mutually set. As a result, hamming weight of the data path unit is fixed and a number of transitions of signal line is also fixed.

In static power, hamming weight of data is a problem. In the data path unit of dual rail logic, one bit data is represented as (1,0) or (0,1). For example, in single rail logic, hamming weight of eight bits data "0x18 (00011000b)" is "2", and hamming weight of eight bits data "0xff (11111111b)" is "8". On the other hand, in dual rail logic, eight bits data "0x18" is represented as (0,1) (0,1) (0,1) (1,0) (1,0) (0,1) (0,1) (0,1). This hamming weight is "8". Eight bits data "0xff" is represented as (1,0) (1,0) (1,0) (1,0) (1,0) (1,0) (1,0) (1,0). This hamming weight is also "8".

In this way, in single rail logic, hamming weight is different based on data contents. However, in dual rail logic, hamming weight is fixed irrespective of data contents because one bit data is represented as (1,0) or (0,1) by dual rail logic.

Figure 9:
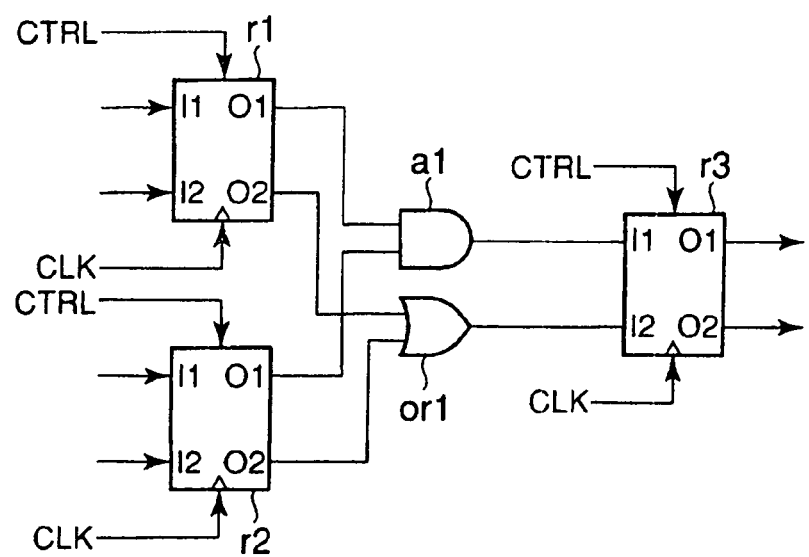
FIG. 9 is a block diagram of data path unit of logical AND operation using a data holding circuit.

FIG. 9 is a block diagram of a dual rail-data path unit for logical AND operation of one bit. As shown in FIG. 9, this operation circuit includes data holding circuits r1~r3 shown in FIG. 2 or FIG. 6, an AND circuit a1, and an OR circuit r1. Hereinafter, by referring to the dual rail-data path unit for logical AND operation of one bit shown in FIG. 8, dynamic consumed power is explained.

In this case, value "1" of one bit data is represented as (1,0), value "0". of one bit data is represented as (0,1), and one bit data of the idle phase is (0,0). Furthermore, the control signal CTRL and the clock signal CLK are supplied as shown in FIG. 2. Briefly, the control signal CTRL "high" represents the working phase, and the control signal CTRL "low" represents the idle phase.

Figure 10:
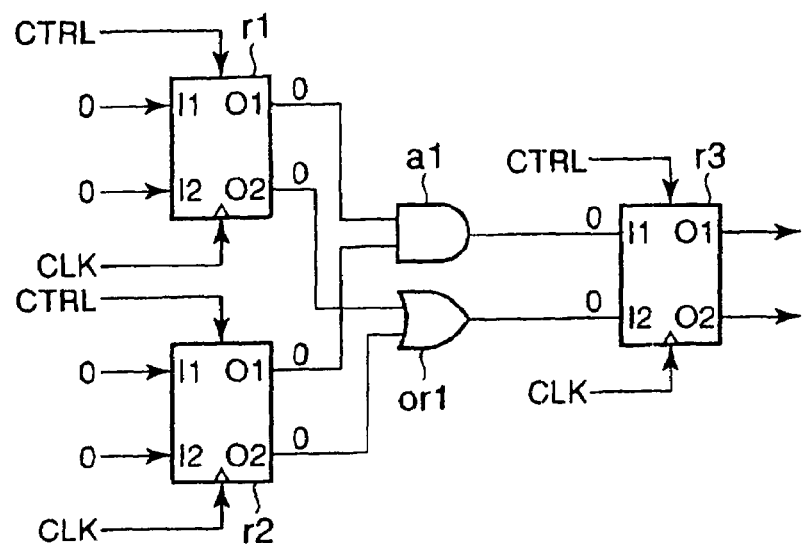
FIG. 10 is a schematic diagram of idle phase of the data path unit of FIG. 7.

First, in a status (idle phase) of FIG. 10, assume that a register R1 holds (0,1), a register r2 holds (1,0), a register r3 holds (1,0), and the control signal is 0 (idle phase). In this state, all signal lines are 0.

Figure 11:
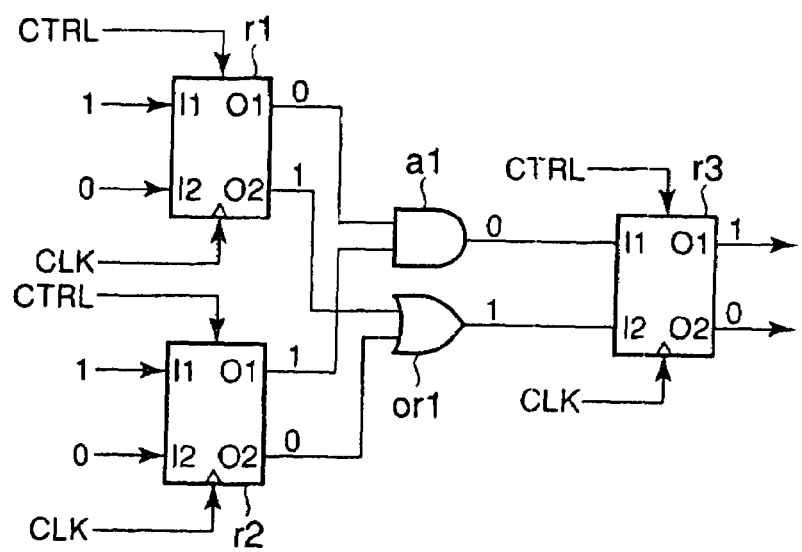
FIG. 11 is a schematic diagram of working phase of the data path unit of FIG. 9.

Next, as shown in FIG. 11, assume that the status changes from the idle phase to the working phase (the control signal is changed from 0 to 1), (1,0) is input to the register r1, and (1,0) is input to the register r2. In this status, the register r1 outputs (0,1), and the register r2 outputs (1,0). These output data are respectively input to a combination circuit a1 and or1 for logical AND operation of dual rail data. This combination circuit outputs the operation result (0,1) to the register r3. The register r3 holds (0,1), and outputs (1,0) previously held.

Seeing that transition from status of FIG. 10 to status of FIG. 11, in six signal lines (four input lines and two output lines) of the combination circuit, statuses of three signal lines change from "0" to "1".

Next, assume that the status changes from the working phase to the idle phase (the control signal is changed from "1" to "0"). Briefly, status is returned from FIG. 11 to FIG. 10. In this state, all signal lines are "0". Seeing that transition from status of FIG. 11 to status of FIG. 10, in six signal lines (four input lines and two output lines) of the combination circuit, statuses of three signal lines change from "1" to "0".

Next, assume that the status changes from the idle phase to the working phase (the control signal is changed from "0" to "1"). Briefly, the status changes from FIG. 10 to FIG. 12. Furthermore, assume that (0,1) is input to the register r1, and (0,1) is input to the register r2. In this status, the register r1 outputs (1,0) held, and the register r2 outputs (1,0) held. These output data are respectively input to the combination circuit a1 and or1 for logical AND operation of dual rail data. This combination circuit outputs the operation result (1,0) to the register r3. The register r3 holds (1,0), and outputs (0,1) previously held.

Figure 12:
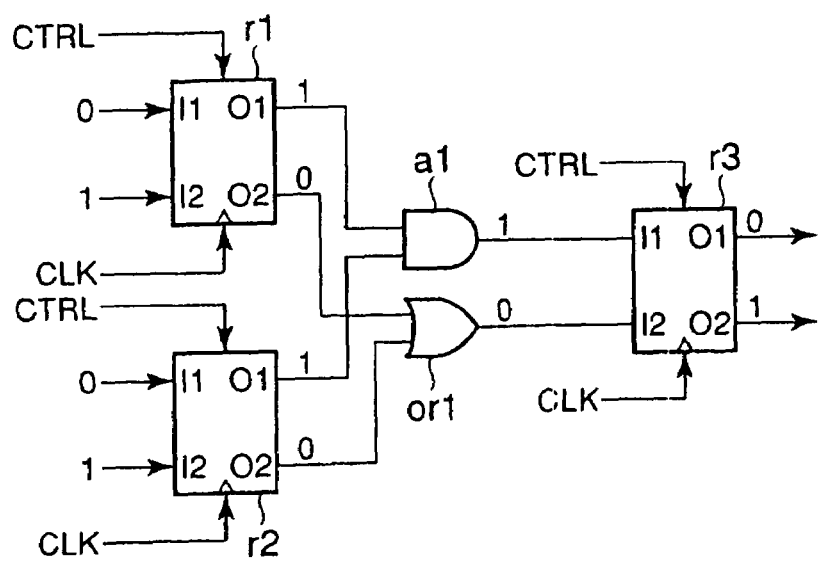
FIG. 12 is a schematic diagram of next working phase of the data path unit of FIG. 9.

Seeing that transition from status of FIG. 10 to status of FIG. 12, in six signal lines (four input lines and two output lines) of the combination circuit, statuses of three signal lines change from "0" to "1".

In this way, irrespective of data contents, a number of signal lines of status transition is fixed. Data of working phase and invalid data of idle phase mutually flow through data path. Accordingly, in signal lines (input and output lines) of the combination circuit in the data path unit, the number of signal lines of which status is transited is fixed, and the dynamic consumed power is fixed.

As mentioned-above, FIG. 9 shows a component example of a dual rail-data path unit for logical AND operation of one bit. However, by suitably modifying this component example, dual rail-data path unit for another logical operation can be realized.

Figure 13:
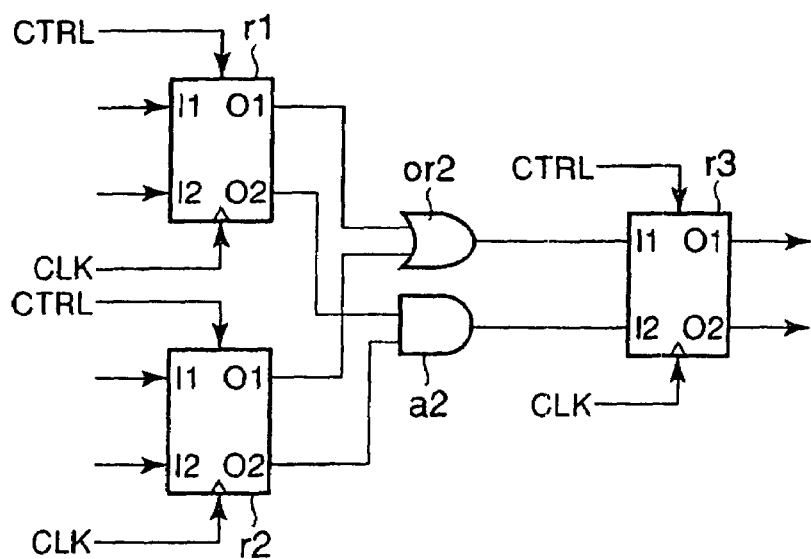
FIG. 13 is a block diagram of data path unit of logical OR operation using the data holding circuit.

FIG. 13 shows a component example of dual rail-data path unit for logical OR operation of one bit. As shown in FIG. 13, this operation circuit includes data holding circuits r1~r3 shown in FIG. 2 or FIG. 6, an OR circuit or2, and an AND circuit a2.

Figure 14:
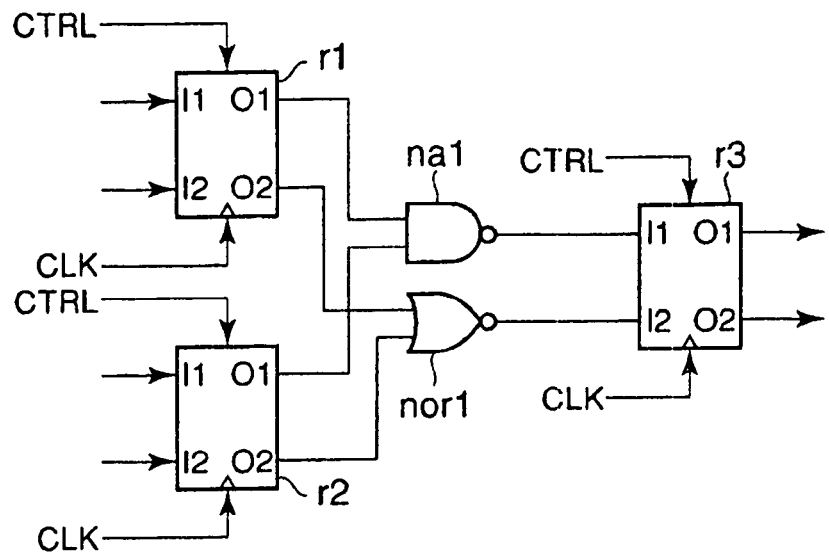
FIG. 14 is a block diagram of data path unit of logical NAND operation using the data holding circuit.

Furthermore, FIG. 14 shows a component example of dual rail-data path unit for logical NAND operation of one bit. As shown in FIG. 14, this operation circuit includes data holding circuits r1~r3 shown in FIG. 2 or FIG. 6, a NAND circuit na1, and a NOR circuit nor1.

Figure 15:
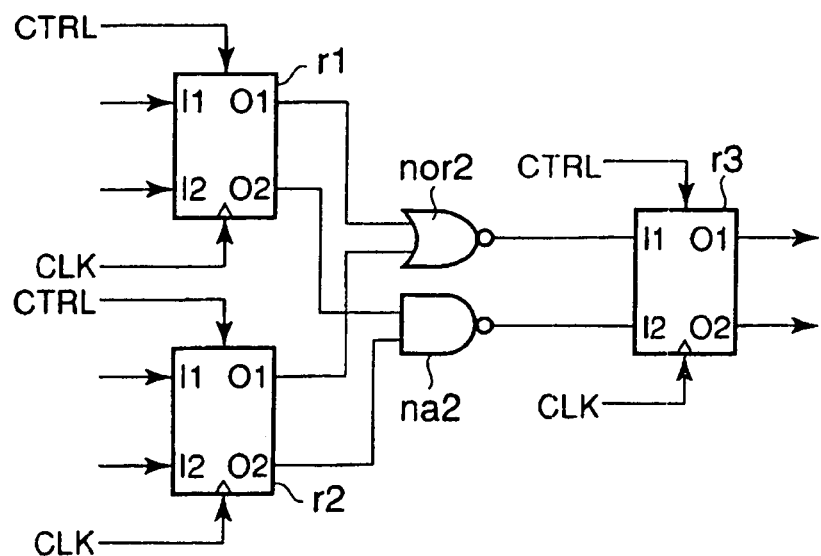
FIG. 15 is a block diagram of data path unit of logical NOR operation using the data holding circuit.

Furthermore, FIG. 15 shows a component example of dual rail-data path unit for logical NOR operation of one bit. As shown in FIG. 15, this operation circuit includes data holding circuits r1~r3 shown in FIG. 2 or FIG. 6, a NOR circuit nor2, and a NAND circuit na2.

Figure 16:
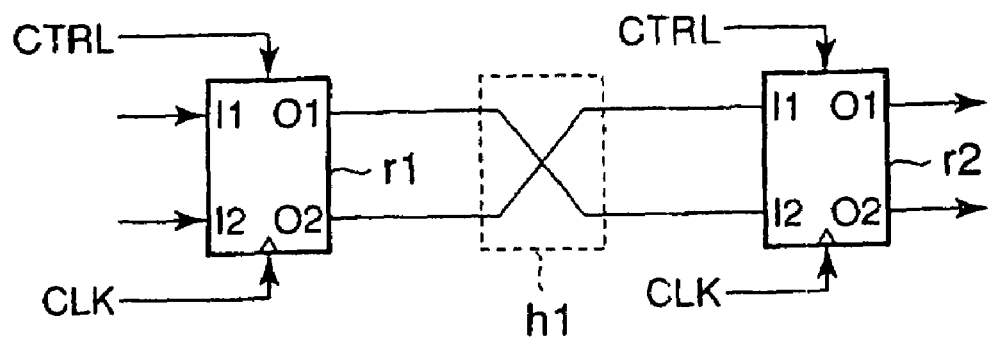
FIG. 16 is a block diagram of data path unit of logical NOT operation using the data holding circuit.
Figure 17:
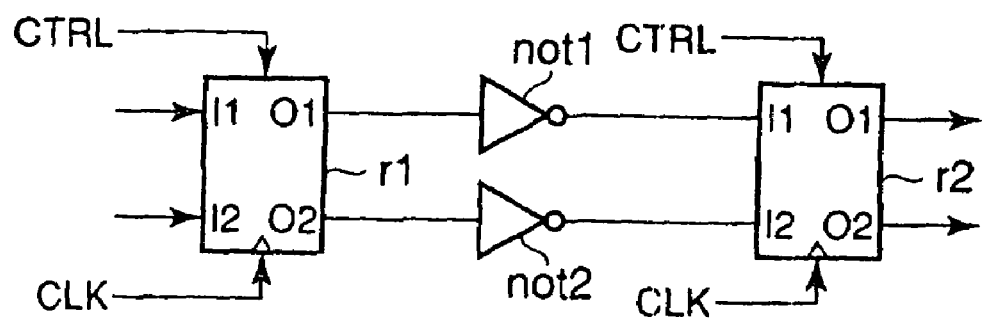
FIG. 17 is another block diagram of the data path unit of FIG. 16.

Furthermore, FIG. 16 shows a component example of dual rail-data path unit for logical NOT operation of one bit. As shown in FIG. 16, this operation circuit includes data holding circuits r1~r2 shown in FIG. 2 or FIG. 6. The first output O1 of the data holding circuit r1 is connected to the second input I2 of the data holding circuit r2, and the second output O2 of the data holding circuit r1 is connected to the second input I1 of the data holding circuit r2 as shown in a wiring part h1 of FIG. 16. In this case, the dual rail-data path unit for logical NOT operation of one bit can be realized using two NOT circuits (two inverters) not1 and not2 as shown in FIG. 17.

In the above explanation, invalid data (0,0) represents the idle phase. However, invalid data (1,1) may represent the idle phase. Furthermore, invalid data (0,0) and (1,1) may be used together. For example, these invalid data may be mutually or randomly used.

In the above explanation, the working phase and the idle phase are mutually set. However, another set method may be possible. For example, the idle phase may be set after a plurality of working phases is continuously set, or may be set at random.

In the above explanation, one bit data is represented using two signal lines. However, one bit data may be represented using three or more signal lines. For example, if one bit data is represented using four signal lines, one bit data "1" is represented as (1, 1, 0, 0,), and one bit data "0" is represented as (0, 0, 1, 1). Furthermore, if one bit data is represented using five signal lines, one bit data "1" is represented as (1, 0, 1, 0, 1), and one bit data "0" is represented as (0, 1, 0, 1, 0).

As mentioned-above, in the present invention, irrespective of the data contents of an operation object, the consumed power can be fixed.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for processing data, comprising:
a plurality of input signal lines;
a plurality of output signal lines;
an electronic circuit configured to input first data from the plurality of input signal lines and to output second data to the plurality of output signal lines, the first data being one bit data represented by a combination of bits of the plurality of input signal lines, and the second data being one bit data represented by a combination of bits of the plurality of output signal lines,
wherein the combination of bits of the plurality of signal lines of the one bit data "0" is a first bit status, the combination of bits of the plurality of signal lines of the one bit data "1" is a second bit status, and a hamming weight of the first bit status is equal to a hamming weight of the second bit status; and
an input unit configured to input a control signal representing a distinction between a working phase and an idle phase, the working phase being a period to input and output the first bit status or the second bit status, and the idle phase being a period to input and output a third bit status as the combination of bit status of the plurality of signal lines of invalid data.

2. The apparatus according to claim 1,
wherein the idle phase is inserted between two working phases neighbored on a time axis.

3. The apparatus according to claim 1,
wherein the hamming distance between the first bit status and the third bit status is equal to the hamming distance between the second bit status and the third bit status.

4. The apparatus according to claim 3,
wherein the plurality of input signal lines and the plurality of output signal lines are respectively two as a first signal line and a second signal line.

5. The apparatus according to claim 4,
wherein the first bit status is a combination of the bit "1" of the first signal line and the bit "0" of the second signal line or a combination of the bit "0" of the first signal line and the bit "1" of the second signal line,
wherein the second bit status is an inverse of the first bit status, and
wherein the third bit status is a combination of the bit "0" of the first signal line and the bit "0" of the second signal line or a combination of the bit "1" of the first signal line and the bit "1" of the second signal line.

6. The apparatus according to claim 1,
wherein said input unit inputs a clock signal of which period between a rise edge and a fall edge is shorter than a period of the working phase of the control signal, and of which period between a rise edge and next rise edge is larger than the period of the working phase of the control signal.

7. The apparatus according to claim 6,
wherein, if the control signal represents the working phase, said electronic circuit inputs the one bit data of the first bit status or the second bit status from the plurality of input signal lines based on the clock signal, and holds the one bit data.

8. The apparatus according to claim 7,
wherein, if the control signal represents the next working phase, said electronic circuit outputs the one bit data held to the plurality of output signal lines based on the clock signal.

9. The apparatus according to claim 8,
wherein, if the control signal represents the idle phase, said electronic circuit does not input the invalid data from the plurality of input signal lines.

10. The apparatus according to claim 9,
wherein, if the control signal represents the idle phase, said electronic circuit outputs predetermined invalid data to the plurality of output signal lines based on the clock signal.

11. The apparatus according to claim 7,
wherein said input unit inputs the one bit data at a rate of one time in two times of the rise edge or the fall edge of the clock signal.

12. A logical operation apparatus, comprising:
a first data holding circuit configured to input one bit data represented by a combination of bits of two signal lines, to temporarily store the one bit data, and to output the one bit data;
a second data holding circuit configured to input one bit data represented by a combination of bits of other two signal lines, to temporarily store the one bit data, and to output the one bit data;
a first logical operation circuit configured to execute a logical operation of a first input data and a second input data, the first input data being a bit status of a first output signal line of the first data holding circuit, the second input data being a bit status of a first output signal line of the second data holding circuit;
a second logical operation circuit configured to execute a logical operation of a first input data and a second input data, the first input data being a bit status of a second output signal line of the first data holding circuit, the second input data being a bit status of a second output signal line of the second data holding circuit and
a third data holding circuit configured to input one bit data represented by a combination of bits of an output signal line of the first logical operation circuit and an output signal line of the second logical operation circuit.

13. The logical operation circuit according to claim 12,
wherein the first logical operation circuit executes AND operation of the first input data and the second input data, and
wherein the second logical operation circuit executes OR operation of the first input data and the second input data.

14. The logical operation circuit according to claim 12,
wherein the first logical operation circuit executes OR operation of the first input data and the second in put data, and
wherein the second logical operation circuit executes AND operation of the first input data and the second input data.

15. The logical operation circuit according to claim 12,
wherein the first logical operation circuit executes NAND operation of the first input data and the second input data, and
wherein the second logical operation circuit executes NOR operation of the first input data and the second input data.

16. The logical operation circuit according to claim 12,
wherein the first logical operation circuit executes NOR operation of the first input data and the second input data, and
wherein the second logical operation circuit executes NAND operation of the first input data and the second input data.

17. A logical operation apparatus, comprising:
a first data holding circuit configured to input one bit data represented by a combination of bits of two signal lines, to temporarily store the one bit data, and to output the one bit data by a first output signal line and a second output signal line;
a second data holding circuit configured to input one bit data from a first input signal line and a second input signal line, the one bit data being represented by a reverse combination of bits of the first output signal line and the second output signal line, to temporarily store the one bit data, and to output the one bit data;
a first inverter configured to input a bit status of the first output signal line, and to output a reverse status of the bit status to the first input signal line of the second data holding circuit; and
a second inverter configured to input a bit status of the second output signal line, and to output a reverse status of the bit status to the second input signal line of the second data holding circuit.

* * * * *